F. B. Duffy,
Spring Bed Bottom,
No. 58,394. Patented Oct. 2, 1866.
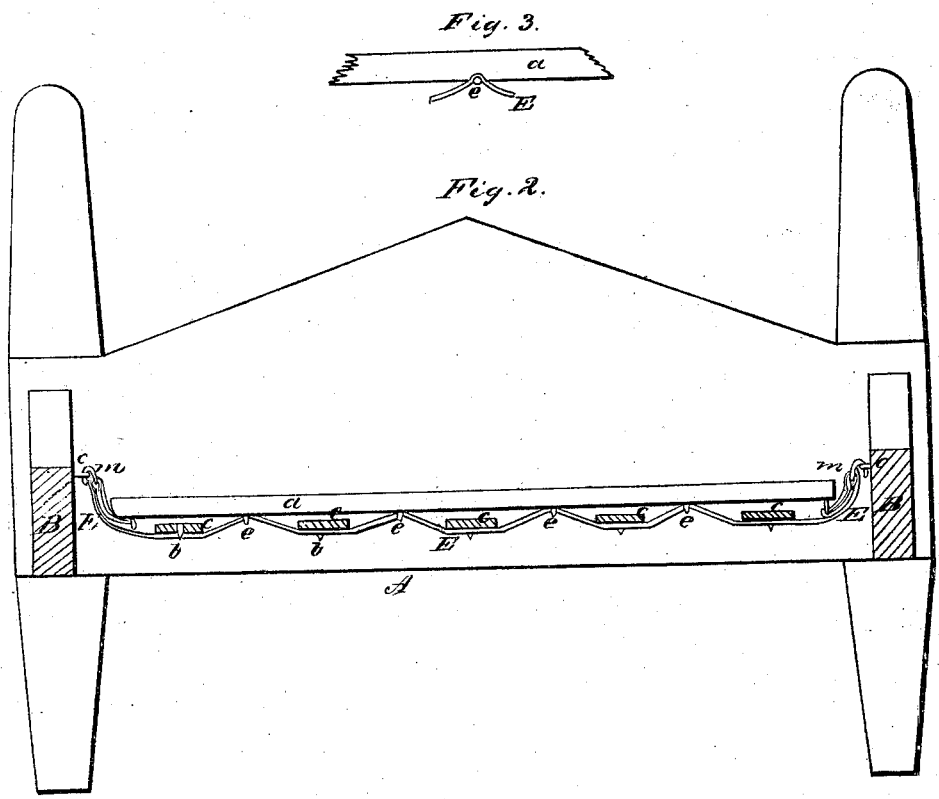

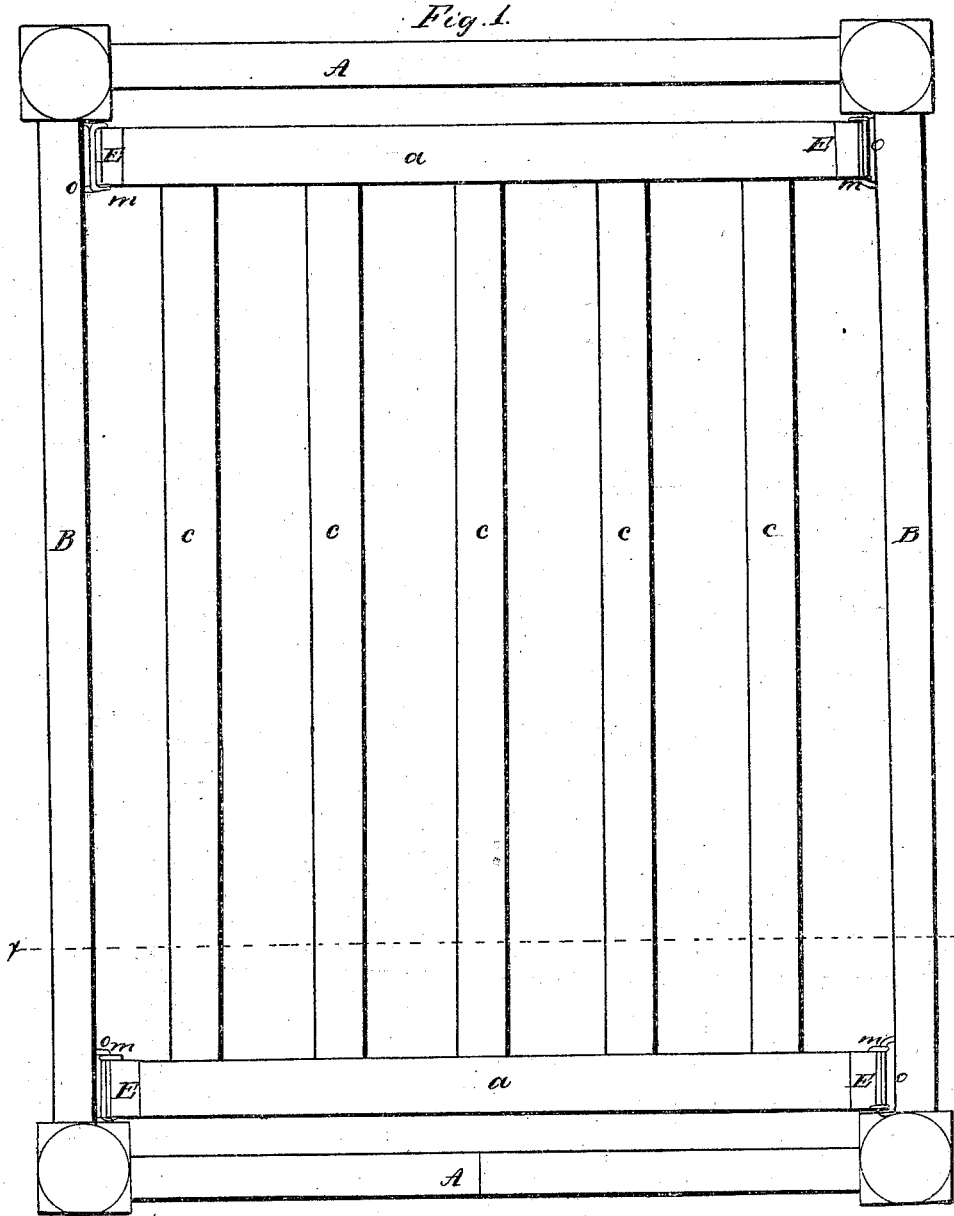

UNITED STATES PATENT OFFICE.

F. B. DUFFY, OF SPARTA, WISCONSIN.

IMPROVED BED-BOTTOM.

Specification forming part of Letters Patent No. 58,394, dated October 2, 1866.

*To all whom it may concern:*

Be it known that I, FRANK B. DUFFY, of Sparta, in the county of Monroe and State of Wisconsin, have invented certain new and useful Improvements in Spring Bed-Bottoms; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a top-plan view; Fig. 2, a transverse section on the line $x\ x$ of Fig. 1.

In the drawings, A represents the head and foot rails, and B the side rails, of an ordinary bedstead.

To form my improved bed-bottom, I take a strip of wood, as represented by $a$, of sufficient length to reach nearly across the bedstead, and to its under side I secure an elastic strap or webbing, as shown by E in Fig. 2. This elastic strap is secured to the bar $a$, at intervals equal to the distance between the slats $c$, by means of a wire staple, $e$, which presses the strap into a groove cut in the bar $a$ at that point, as shown in Fig. 3. By this means the strap is held securely at each point by the staples $e$ and is prevented from slipping. At the ends of the bar $a$ the strap E is doubled two or three times, in order to increase its strength, and has secured to its end a hook, $m$, which hooks into a staple, $o$, secured to the side rails, B, near each end, as shown in Fig. 1. I then provide a series of spring-slats, made of wood, as represented by $c$, and insert their ends between the bar $a$ and the elastic strap E, as shown in Fig. 2, a pin, $b$, serving to secure them in position and prevent them from slipping out.

It will thus be seen that each of the slats $c$ is a spring of itself, and that the elastic that supports the end of each yields independent of the rest, while at the same time the bottom as a whole is permitted to yield by the spring of the elastic straps at the ends, where it is secured to the rails B. In this manner I overcome the difficulty created by the slipping of the elastic cords hung over a series of hooks between the slats, and at the same time the bottom can be attached or removed in a most expeditious manner by simply attaching or detaching the hooks $m$.

Having thus described my invention, what I claim is—

A spring bed-bottom consisting of the slats $c$, resting at their ends on the elastic strap E, secured to the bar $a$ by the staples $e$, and the whole secured to the bedstead by means of the hooks $m$ and staples $o$, as set forth.

FRANK B. DUFFY.

Witnesses:
S. D. NEWBRO,
O. D. NEWBRO.